United States Patent
Golko et al.

(10) Patent No.: US 9,614,378 B2
(45) Date of Patent: Apr. 4, 2017

(54) INDUCTIVE CHARGING INTERFACE WITH MAGNETIC RETENTION FOR ELECTRONIC DEVICES AND ACCESSORIES

(71) Applicant: APPLE INC., Cupertino, CA (US)

(72) Inventors: Albert J. Golko, Saratoga, CA (US); Eric S. Jol, San Jose, CA (US); Nathan P. Bosscher, Campbell, CA (US); Todd K. Moyer, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 98 days.

(21) Appl. No.: 14/500,543

(22) Filed: Sep. 29, 2014

(65) Prior Publication Data

US 2015/0091388 A1  Apr. 2, 2015

Related U.S. Application Data

(60) Provisional application No. 61/884,476, filed on Sep. 30, 2013.

(51) Int. Cl.
*H01F 38/00* (2006.01)
*H02J 5/00* (2016.01)
(Continued)

(52) U.S. Cl.
CPC ............ *H02J 5/005* (2013.01); *H01F 7/206* (2013.01); *H01R 13/6205* (2013.01); *H02J 7/025* (2013.01); *H01F 2007/208* (2013.01)

(58) Field of Classification Search
CPC ..... H02J 5/005; H01F 7/206; H01F 2007/208
(Continued)

(56) References Cited

U.S. PATENT DOCUMENTS 5,455,467 A * 10/1995 Young .................. G06F 1/1632
                                                                  307/104
6,492,956 B1 * 12/2002 Fischer .................... H01Q 7/08
                                                                   343/788
(Continued)

OTHER PUBLICATIONS

International Search Report and Written Opinion for International PCT Application No. PCT/US2014/058287, mailed Jan. 26, 2015, 11 pages.

*Primary Examiner* — Jared Fureman
*Assistant Examiner* — Alfonso Perez Borroto
(74) *Attorney, Agent, or Firm* — Kilpatrick Townsend & Stockton LLP

(57) ABSTRACT

An inductive charging interface with magnetic retention can be used for charging electronic devices and accessories. For example, a magnetic core of an inductive charging configuration may be divided into two magnetic elements, one element can be housed within a receptacle or receiving connector of housing of an electric device and the other element can be housed within a plug or transmission connector. The poles of the two elements of the magnetic core may create a magnetic field to retain the plug connector in an aligned, mated position with the receptacle connector of the electronic device in addition to directing magnetic flux to flow in a circular path around and between the two elements of the magnetic core, thereby inducing a current for charging the internal battery of a device.

20 Claims, 10 Drawing Sheets

(51) Int. Cl.
 *H01F 7/20* (2006.01)
 *H02J 7/02* (2016.01)
 *H01R 13/62* (2006.01)
(58) Field of Classification Search
 USPC .......................................................... 307/104
 See application file for complete search history.

(56) References Cited

U.S. PATENT DOCUMENTS

| | | | |
|---|---|---|---|
| 2010/0146308 A1* | 6/2010 | Gioscia | G06F 1/1632 713/300 |
| 2010/0312310 A1* | 12/2010 | Meskens | A61N 1/3787 607/61 |
| 2011/0304220 A1* | 12/2011 | Whitehead | H01F 21/08 307/104 |
| 2012/0295451 A1 | 11/2012 | Hyun-Jun et al. | |
| 2013/0210244 A1 | 8/2013 | DiFonzo et al. | |
| 2015/0077206 A1* | 3/2015 | Leyland | H01F 7/0263 336/110 |

* cited by examiner

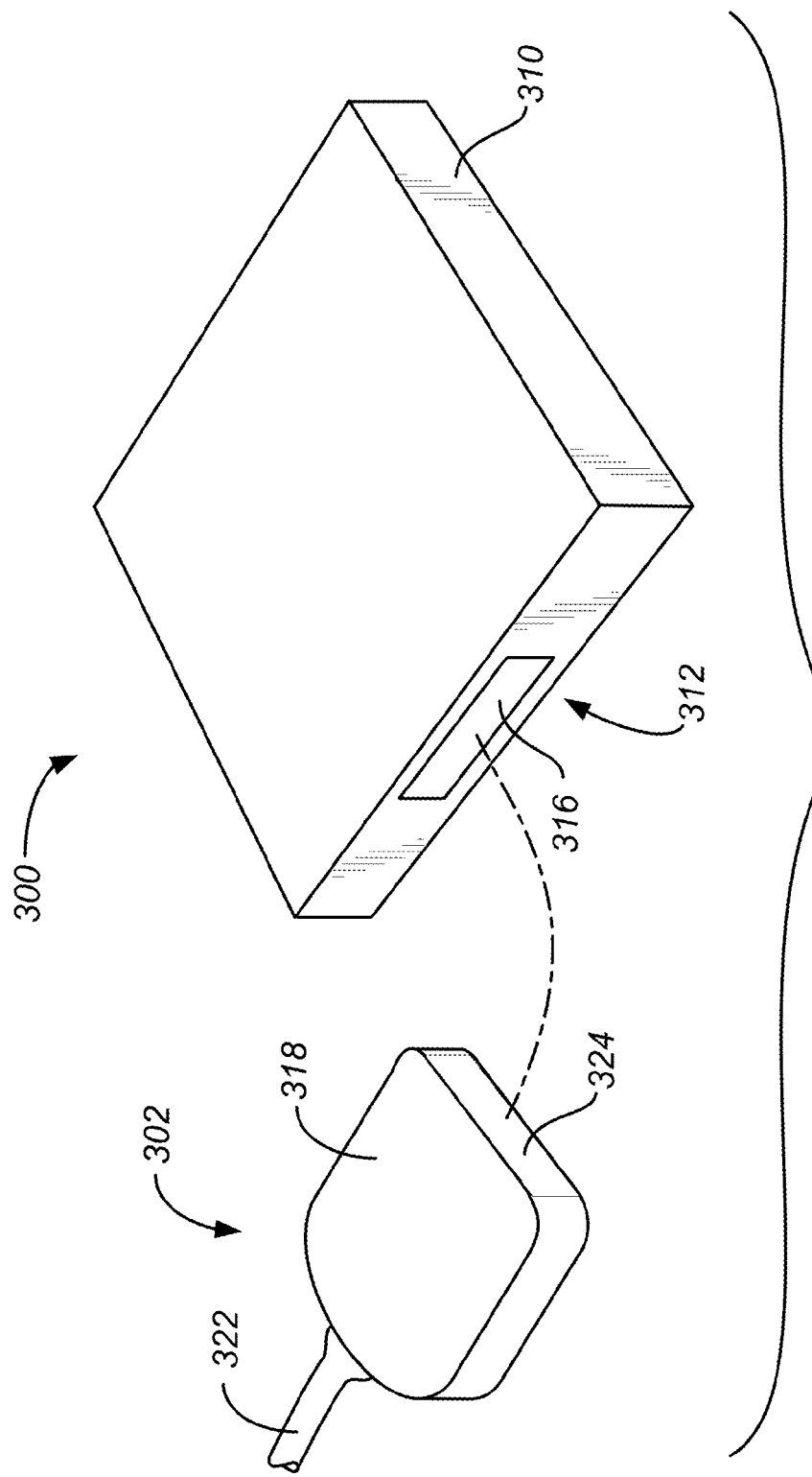

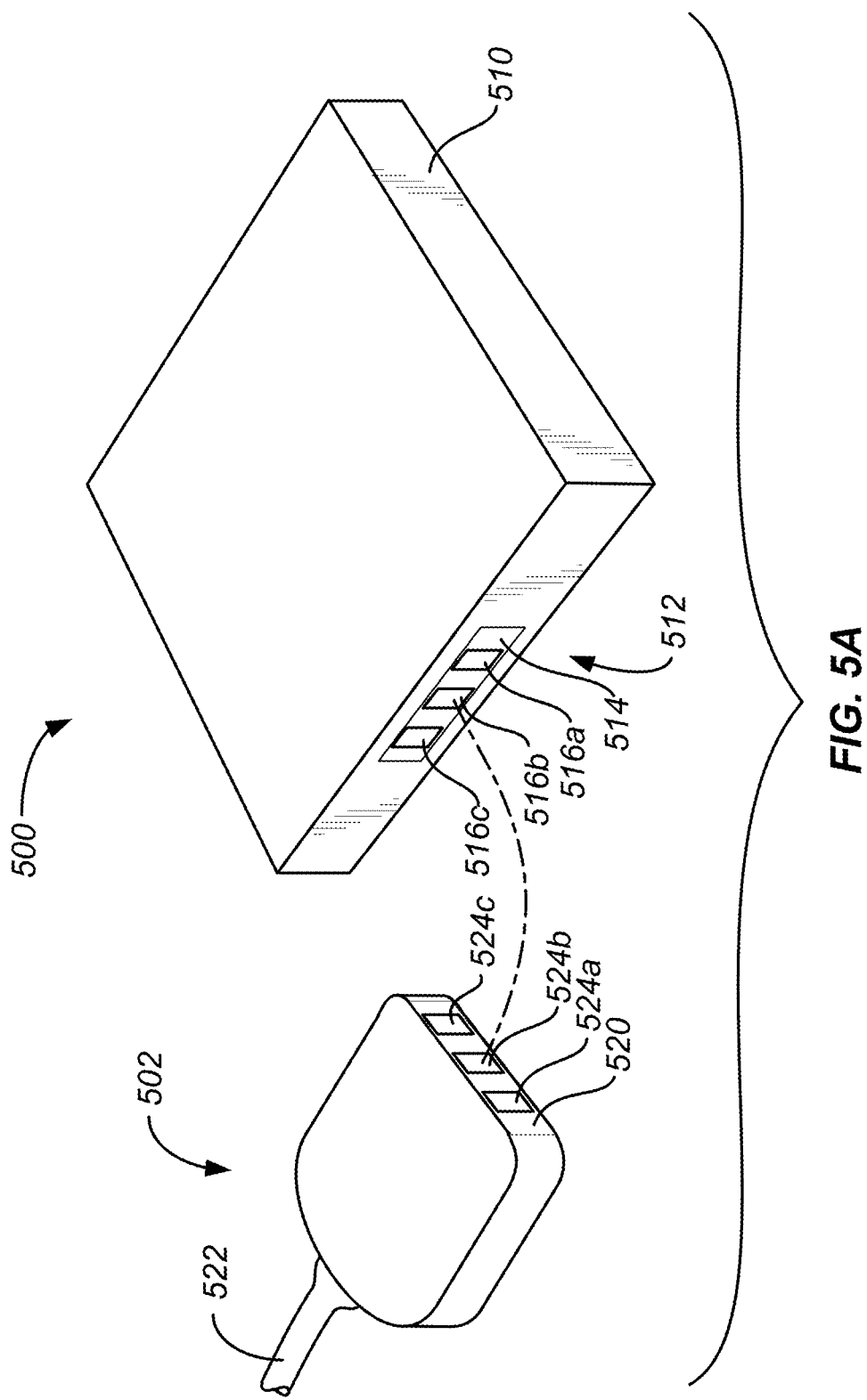

INDUCTIVE CHARGING INTERFACE WITH MAGNETIC RETENTION FOR ELECTRONIC DEVICES AND ACCESSORIES

CROSS-REFERENCES TO RELATED APPLICATIONS

The present application claims the benefit of U.S. Provisional Application No. 61/884,476, filed Sep. 30, 2013, which is hereby incorporated by reference for all purposes.

BACKGROUND

The present invention relates generally to inductive charging interfaces, and in particular inductive charging interfaces for mobile devices.

Many electronic devices mate with electrical connectors that provide power. For example, devices, such as tablets, laptops, netbooks, desktops, and all-in-one computers; cell, smart, and media phones; storage devices, portable media players, navigation systems, monitors, and others, can be mated with electrical connectors in order to charge their internal batteries.

Wired charging via electrical connectors (e.g., plug and receptacle connectors) is commonly used but wireless charging, and specifically inductive charging, is becoming increasingly common. However, while inductive charging is sometimes more convenient than wired charging, inductive charging historically has been very inefficient due to high energy losses, e.g., due to leakage flux, non-ideal magnetic paths, etc. These losses result in wasted resources as well as longer charge times as compared with wired charging.

Furthermore, in order to inductively charge electronic devices, large receiving coils are currently implemented within electronic devices. These receiving coils consume a significant amount of scarce space within increasingly compact electronic devices. A corresponding transmission coil is typically located within a charging pad to inductively charge these electronic devices when placed on the pad.

As electronic devices continue to consumer more power, there is an increasing demand for convenient, power-efficient and space-efficient methods of charging these electronic devices.

SUMMARY

Various embodiments of the invention pertain to an interface for high-efficiency inductive charging of electronic devices, including mobile electronic devices. Although some energy losses in inductive charging may be inherent and unavoidable, other losses caused by the misalignment of or large distance between receiving and transmission inductive charging elements can be reduced in embodiments of the present invention.

For example, a magnetic core of an inductive charging configuration may be divided into two magnetic elements; one element can be housed within a receptacle or receiving connector of a housing of an electric device and the other element can be housed within a plug or transmission connector. In some embodiments, these two elements can be shaped like U-shaped halves of a toroid. The poles of the two elements of the magnetic core may create a magnetic field to retain the plug connector in an aligned, mated position with the receptacle connector of the electronic device in addition to directing magnetic flux to flow in a circular path around and between the two elements of the magnetic core. Corresponding distal ends of the elements of the magnetic core may be in close proximity in the mated position, separated only by windows—thin pieces of magnetically permeable material. Additional elements corresponding to those of a typical transformer or inductive charger can also be included in this inductive charging configuration.

Instead of relying on the plug and receptacle connector of the present invention to provide data to electronic devices, wireless means such as Wi-Fi, other wireless protocols, and antenna coupling can be used to allow the electronic devices of the present invention to receive and send data. As such, accidental breakage that is common with conventional electrical connectors can be avoided via the breaking of magnetic retention instead of structural elements such as retention features or a connector housing.

Furthermore, as will be discussed in further detail below, the present invention may even allow for faster charging times due the higher charging efficiencies provided for in embodiments of the present invention.

According to one embodiment, a plug connector supporting inductive charging is provided. The plug connector can include a magnetic element having poles aligned to generate a magnetic field that attracts a corresponding receptacle connector of an electronic device and orients and aligns the plug connector therewith, a wire wound around the magnetic element to form an inductive transmission coil, an electrical connection coupled to the inductive transmission coil and configured to apply a current to the inductive transmission coil to induce a current in an inductive receiving coil of the corresponding receptacle connector and a magnetically permeable window adjacent to the magnetic element. The magnetically permeable window can form a portion of an exterior surface of the plug connector. The magnetically permeable window also can be configured to allow magnetic flux to flow to and from the corresponding receptacle connector when the corresponding receptacle connector is mated with the plug connector.

According to another embodiment, an electronic device that supports inductive charging is provided. The electronic device can include a receptacle connector having a mating surface configured to mate with a corresponding plug connector. The receptacle connector can include a magnetic element having poles positioned to generate a magnetic field that attracts a corresponding plug connector and orients and aligns the corresponding plug connector with the receptacle connector, and a wire wound around the magnetic element to form an inductive receiving coil. The mating surface can be located adjacent to the magnetic element, form a portion of an exterior surface of the electronic device and be configured to allow magnetic flux to flow to and from the corresponding plug connector when the corresponding plug connector is mated with the receptacle connector. The electronic device can also include a battery within the electronic device and a charging circuit within the electronic device. The charging circuit can be configured to use an induced current received from the inductive receiving coil to charge the battery.

According to yet another embodiment, a plug connector supporting inductive charging is provided. The plug connector can include a housing having a mating end configured to mate with a corresponding receptacle connector. The housing can include a magnetic element having poles aligned to generate a magnetic field that attracts a corresponding receptacle connector of an electronic device and orients and aligns the plug connector therewith, a wire wound around the magnetic element to form an inductive transmission coil and an electrical connection coupled to the inductive transmission coil and configured to apply a current to the inductive transmission coil to induce a current in a inductive receiving coil of the corresponding connector. The mating end can be further configured to allow magnetic flux to flow to and from the corresponding receptacle connector when the corresponding receptacle connector is mated with the plug connector. The plug connector can also include a cable coupled to the housing.

Although aspects of the invention are described in relation to plug and receptacle connectors for mobile devices and mobile device accessories, it is appreciated that these aspects and methods can be used in a variety of different environments such as larger or smaller electronic devices, e.g., electric vehicles and/or hearing aids.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 3 illustrates a simplified perspective view of a device and a plug connector corresponding to a receptacle connector of the device, according to an embodiment of the present invention;

FIGS. 5A and 5B illustrate simplified perspective and internal structure views of a device and a plug connector corresponding to a receptacle connector of the device, according to an embodiment of the present invention.

DETAILED DESCRIPTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Embodiments of the present invention can provide for high efficiency inductive charging of mobile devices and accessories by facilitating the flow of magnetic flux along more optimal paths. For example, a magnetic core of an inductive charging configuration may be divided into two magnetic elements; one element can be housed within or near a receptacle or receiving connector of an electric device and the other element can be housed within or near a plug or transmission connector. When the plug and receptacle connectors are joined, the two magnetic elements may combine to form a closed magnetic flux path. The magnetic flux may travel in circular motion within and between the magnetic elements, as directed by the poles of the magnetic elements. Additional elements corresponding to those of a typical transformer or an inductive charger can also be included in this inductive charging configuration.

This closed flux path may limit losses that typically occur with open magnetic flux paths and increase the strength of the magnetic field between the magnetic elements. As such, in embodiments of the present invention, devices may receive around 90% of the power transmitted by corresponding plug connectors, i.e., 90% inductive charging efficiency may be achieved. The magnetic field may also serve to align the plug and receptacle connectors with respect to each other as well as to provide a retention force to hold the plug connector in a mated position with the receptacle connector.

Some embodiments can provide blind mating of the plug and receptacle connectors. That is, mating of the connectors may occur simply by bringing the connectors within proximity of each other. Magnetic forces may bring the connectors into physical contact with each other in the proper orientation and alignment.

Although the present invention is comparable with other inductive chargers configurations in terms of function, the present invention physically resembles current wired charging configurations. The following figure is an example of a wired charging configuration that may be useful in illustrating some of the advantages of the present invention.

I. Traditional Wired Interface

Figure 1A:
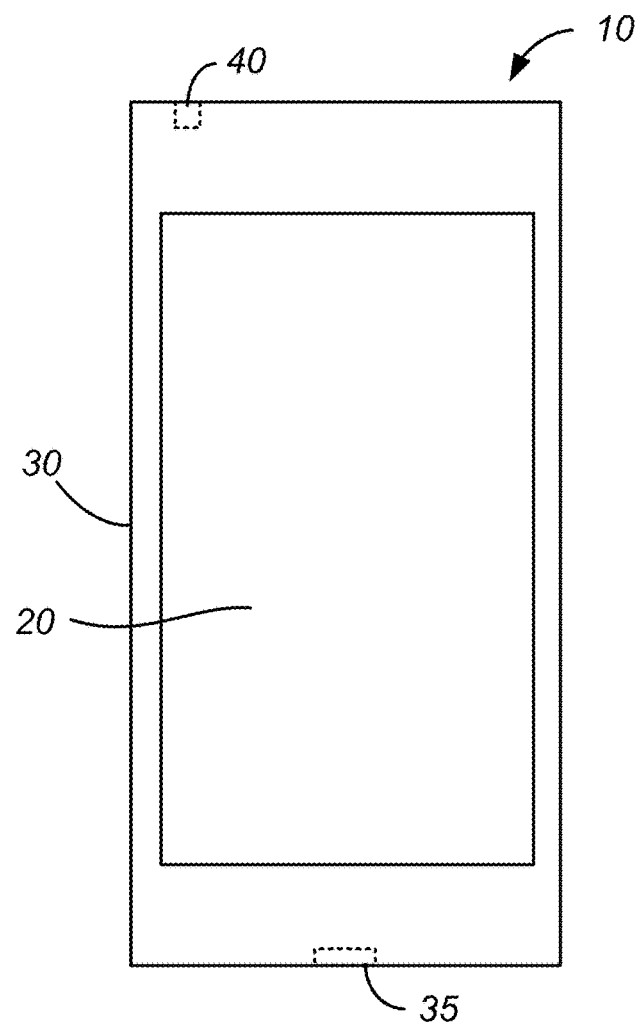
FIG. 1A depicts an illustrative rendering of one particular electronic device.

FIG. 1A depicts an illustrative rendering of one particular electronic device 10. Device 10 includes a touch screen display 20 as both an input and an output component housed within a device housing 30. Device 10 also includes a primary receptacle connector 35 and an audio plug receptacle 40 within device housing 30. Each of the receptacle connectors 35 and 40 can be positioned within housing 30 such that the cavity of the receptacle connector into which a corresponding plug connector is inserted can be located at an exterior surface of the device housing. The cavity can open to an exterior side surface of device 10. For simplicity, various internal components, such as the control circuitry, graphics circuitry, bus, memory, storage device and other components are not shown in FIG. 1A.

Figure 1B:
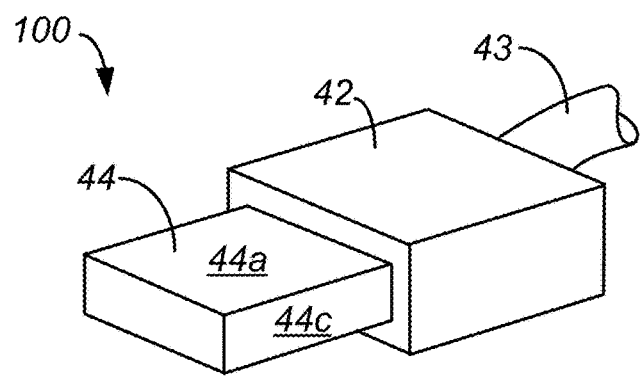
FIG. 1B is a simplified perspective view of plug connector that can be mated with a corresponding primary receptacle connector of the device.

FIG. 1B is a simplified perspective view of plug connector 100 that can be mated with a corresponding primary receptacle connector 35 of device 10 (shown in FIG. 1A). As shown in FIG. 1B, plug connector 100 includes a body 42 and a tab or insertion end 44 that extends longitudinally away from body 42 in a direction parallel to the length of the connector. A cable 43 is attached to body 42 at an end opposite of insertion end 44.

Insertion end 44 is sized to be inserted into corresponding receptacle connector 35 during a mating event and may include contacts (not shown) formed on a first major surface 44*a* and a second major surface 44*b* (not shown) opposite surface 44*a*. Surfaces 44*a*, 44*b* extend from a distal tip or end of the insertion end to body 42. When insertion end 44 is inserted into corresponding receptacle connector 35, surfaces 44*a*, 44*b* abut a housing of receptacle connector 35 or device 10. Insertion end 44 also includes first and second opposing side surfaces 44*c*, 44*d* (not shown) that extend between the first and second major surfaces 44*a*, 44*b*. The contacts of connector 100 (not shown) can be used to carry a wide variety of signals including digital signals and analog signals as well as power and ground.

As illustrated and described above with reference to FIGS. 1A and 1B, wired charging configurations can include numerous complex features on the plug as well as the receptacle connector side to accommodate wired charging, e.g., receptacle connector cavities, accommodations for exposed connector contacts, retention features, complex geometries and materials chosen to protect the connectors against accidental breakage. Inductive charging configuration may eliminate the necessity of all or some these wired charging features.

However, current methods of inductive charging are not without shortcomings. As mentioned above, in order to inductively charge electronic devices, receiving coils that consume a significant amount of scarce space within increasingly compact electronic devices are required and even then high energy losses, e.g., due leakage flux, non-ideal magnetic paths, etc., are likely to occur. For example, in inductive charging configurations, the charging pad and the mobile device include charging coils that are typically arranged in a planar spiral pattern, the coils being oriented in planes that are parallel to each other and separated by a distance, e.g., several millimeters. Magnetic flux may flow in two circular patterns between the charging coils and about a plane that is perpendicular to the planes in which the charging coils are oriented. These circular patterns may represent non-closed, non-ideal magnetic flux flow paths.

II. Inductive Charging Interface With Magnetic Retention

Figure 2A:
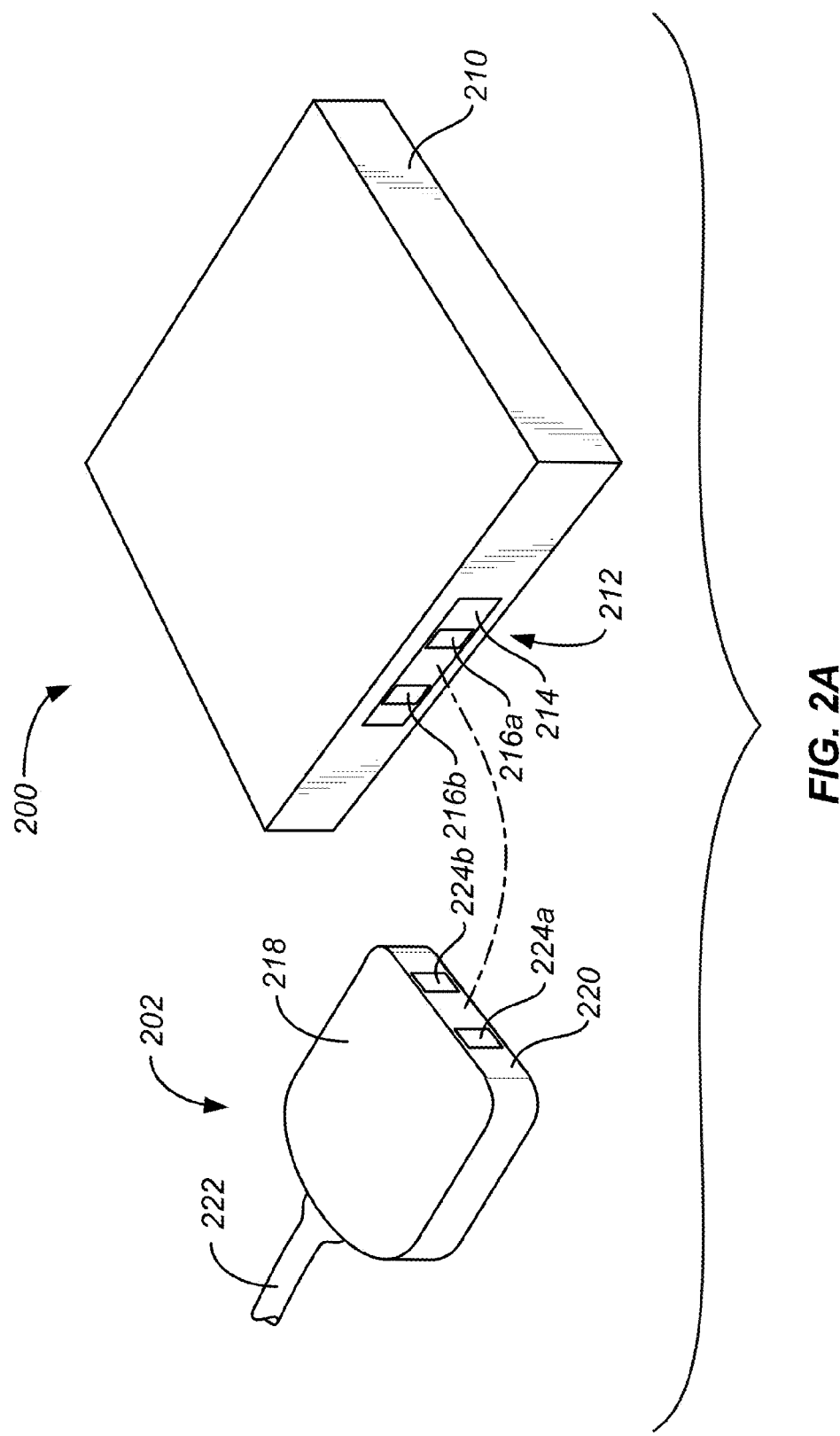
FIGS. 2A and 2B illustrate simplified perspective and internal structure views of a device and a plug connector corresponding to a receptacle connector of the device, according to an embodiment of the present invention.
Figure 2B:
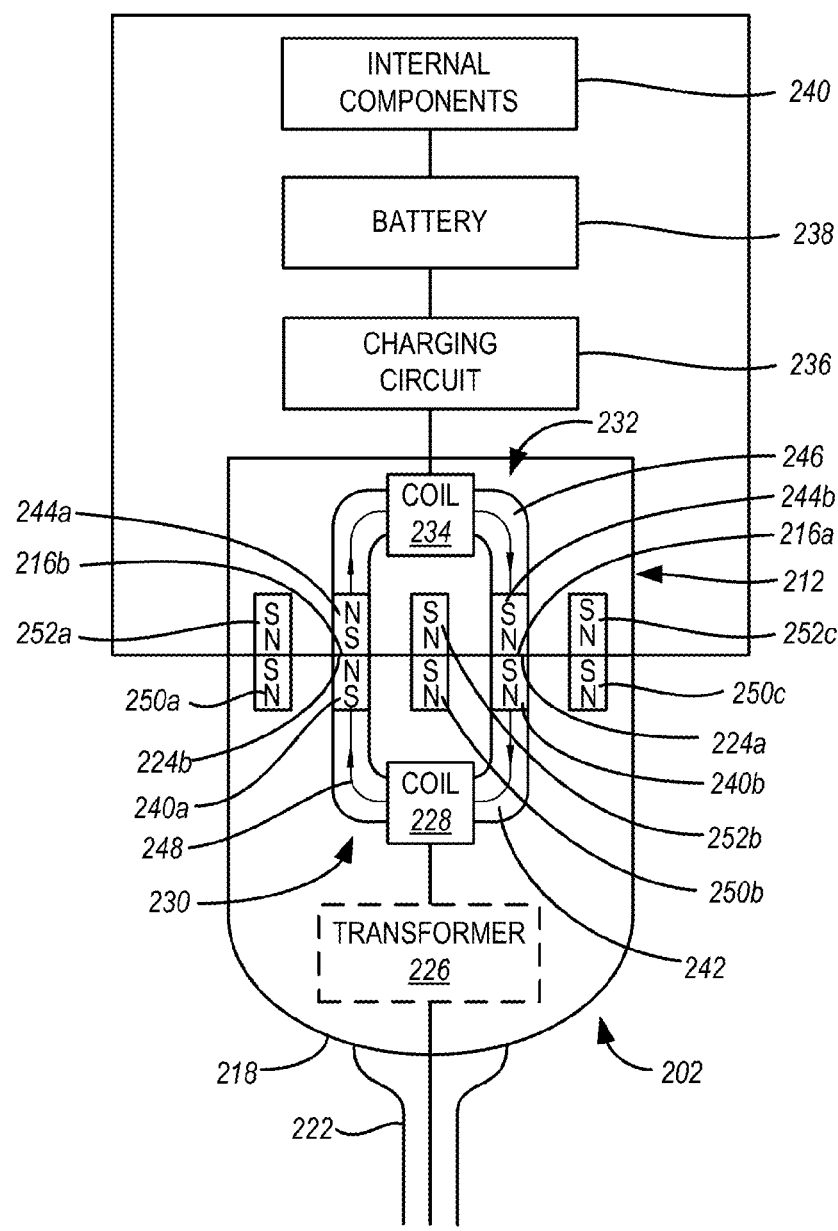

In contrast with the current methods of inductive charging briefly described above, the receiving and transmission coils of the present invention are wrapped around halves of a magnetic core, which halves guide the magnetic flux flow along a substantially closed flux flow path. One of the halves of the magnetic core can be located within each of the plug and receptacle connectors and can provide one or more magnetic flux flow paths or loops. The halves of the magnetic core also provide magnetic retention to hold a receiving or receptacle connector of a device and a plug connector in a mated position. The following figures illustrate examples of (A) a single loop inductive charging interface, (B) a multi-loop inductive charging interface and (C) a multi-planar loop inductive charging interface A. Single Loop Inductive Charging Interface FIGS. 2A and 2B illustrate simplified perspective and internal structure views of a device 200 and a plug connector 202 corresponding to a receptacle connector 212 of device 200, according to an embodiment of the present invention. As shown in FIG. 2A, device 200 includes a receptacle connector 212 positioned within a housing 210 such that a mating surface 214 of receptacle connector 212 is disposed at an exterior of the device housing 210. Mating surface 214 includes two magnetically permeable windows 216*a*, 216*b*. The function of windows 216*a*, 216*b* will be described below with reference to FIG. 2B. For simplicity, various internal components, such as the control circuitry, graphics circuitry, bus, memory, storage device and other components are not shown in FIG. 2A.

As further shown in FIG. 2A, plug connector 202 includes a body 218 having a mating end 220 and a cable 222 attached at an end opposite of mating end 220. Mating end 220 is sized to interface with mating surface 214 of corresponding receptacle connector 212 during a mating event and includes first and second magnetically permeable windows 224*a*, 224*b*. When plug connector 202 is mated with corresponding receptacle connector 212, mating end 220 is brought into contact with mating surface 214 such that windows 224*a* and 224*b* can be aligned with and in contact with windows 216*a* and 216*b*, respectively.

Windows 216*a*, 216*b*, 224*a* and 224*b* may be between about 2 mm and 7 mm tall, about 5 mm and 15 mm wide and about 0.25 mm and 0.5 mm thick, and may be made from a magnetically permeable material that is also electrically insulative, e.g., strong polymers, sapphire or other strong materials that are magnetically permeable and electrically insulative. As further described below, these magnetically permeable materials can allow magnetic flux to flow to and from the magnetic elements (as shown in FIG. 2B) and through the windows of plug connector 202 and receptacle connector 212. In addition, the insulative properties of these materials may insulate magnetic flux from the housing 210, which may be made from a metallic, conductive material that could cause losses during inductive charging if not insulated. The following figure illustrates how magnetic flux flows through windows 216*a*, 216*b*, 224*a* and 224*b* and between plug connector 202 and receptacle connector 212 during inductive charging.

Optionally, as shown in FIG. 2B, plug connector 202 can include a transformer 226. An inductive transmission coil 228 can be coupled to transformer 226 and wound around a first magnetic element 230. FIG. 2B also shows that receptacle connector 212 includes a second magnetic element 232 and an inductive receiving coil 234 wound around second magnetic element 232. Device 200 is also shown as including a charging circuit 236, a battery 238 and internal components 240.

First and second magnetic elements 230, 232 both include permanent magnets at their distal tips and a magnetically permeable material, e.g., a ferrite material such as iron, extending between the permanent magnets. More specifically, first magnetic element 230 includes first and second permanent magnets 240*a*, 240*b* and a ferrite material element 242 extending between the first and second permanent magnets 240*a*, 240*b*. Similarly, second magnetic element 232 includes first and second permanent magnets 244*a*, 244*b* and a ferrite material element 246 extending between the first and second permanent magnets 244*a*, 244*b*. As shown in FIG. 2B, the poles of permanent magnets 244*a* and 244*b* are aligned to magnetically attract permanent magnets 240*a* and 240*b*, respectively. First and second magnetic elements 230, 232 may each be U-shaped as shown in FIG. 2B or otherwise shaped, e.g., shaped like halves of a toroid—a half-toroid—or other shapes that would allow for magnetic flux to flow in a circular direction within first and second magnetic elements 230, 232. First and second magnetic elements 230, 232 may function in a manner similar to magnetic, ferromagnetic or ferrite cores in traditional inductive charging configurations.

Device 200 may be inductively charged when plug connector 202 and receptacle connector 212 are mated, as shown in FIG. 2B. During this inductive charging, cable 222 provides power to transformer 226 from a power source, e.g., a wall socket. Transformer 226 converts the power received from cable 222 as necessary and provides A/C power to transmission coil 228. Alternatively, if plug connector 202 does not include transformer 226, cable 222 can provide A/C power directly to transmission coil 228. Transmission coil 228 can be wrapped around first magnetic element 230 of a magnetic core. As time-varying current flows through transmission coil 228, a varying magnetic flux 248 can be created and may flow within and between first and second magnetic elements 230, 234. Magnetic flux 248 travels between first and second magnetic elements 230, 232 via magnetically permeable windows 216a, 216b, 224a and 224b. Thus, the first and second magnetic elements 230, 232 may form portions of a substantially closed flux flow path for varying magnetic flux 248, i.e., varying magnetic flux 248 may flow substantially within first and second magnetic elements 230, 232, as guided by the polarity of permanent magnets 240a, 240b, 244a and 244b.

Magnetic flux 248 can create a time-varying magnetic field that travels through a receiving coil 234 of receptacle connector 212, thereby inducing a time-varying current in receiving coil 234. As shown in FIG. 2B, a charging circuit 236 is coupled to receiving coil 234. As such, the induced current can be provided to and used by charging circuit 236 to charge a battery 238 that powers internal components 240 of device 200, e.g., control circuitry, graphics circuitry, bus, memory, storage device and other components. In this manner, an electrical connection, e.g., cable 222 or transformer 226, may apply a current to inductive transmission coil 228 in order to induce a current in inductive receiving coil 234 and charge device 200.

As mentioned above, the poles of permanent magnets 244a and 244b are aligned to magnetically attract permanent magnets 240a and 240b, respectively. As such, when plug connector 202 is sufficiently proximate receptacle connector 212, magnetic forces will bring plug connector 202 into contact with receptacle connector 212, as shown in FIG. 2B. For example, the magnetic forces may rotate plug connector 202 about its longitudinal axis and translate plug connector 202 in the vertical and/or horizontal directions until orientated and aligned with respect to receptacle connector 212 as shown in FIG. 2B. Additionally, once mated, the magnetic forces can provide a retention force to retain or hold plug connector 202 in contact with receptacle connector 212 in the mated position. The size and/or strength of permanent magnets 244a, 244b, 240a and 240b may be varied to adjust the retention force and the proximity between plug connector 202 and receptacle connector 212 required for plug connector 202 to be oriented, aligned and brought into contact with receptacle connector 212. Thus, an interference fit between receptacle connector 212 and plug connector 202 may not be required, and the retention features outlined above with reference to FIGS. 1A-1B may also not be required.

Additional magnets may be included in plug connector 202 and/or receptacle connector 212 to provide to an increased magnetic retention force. For example, as shown in FIG. 2B, plug connector 202 may include permanent magnets 250a, 250b, 250c and receptacle connector 212 may include permanent magnets 252a, 252b, 252c. The poles of permanent magnets 250a, 250b, 250c, 252a, 252b and 252c may be aligned as shown in FIG. 2B or otherwise aligned such that an additional magnetic force is created between plug connector 202 and receptacle connector 212 to provide magnetic retention. The additional magnets may be electrically isolated, e.g., surrounded by an insulative material such as a polymer, to minimize interference experienced by magnetic flux 248. The number of additional magnets may be varied, e.g., more or less permanent magnets may be implemented in plug connector 202 and receptacle connector 212.

As also mentioned above, the first and second magnetic elements 230, 232 may form portions of a substantially closed flux flow path. The flux flow path between first and second magnetic elements 230, 232 may be substantially closed rather than completely closed because the thickness of windows 216a, 216b, 224a and 224b create small gaps between the first and second magnetic elements 230, 232. These gaps between corresponding distal tips of the first and second magnetic elements 230, 232 may be, for example, between about 0.5 mm and 1.0 mm or between about 0.2 mm and 1.2 mm. Losses may occur at these gaps because the magnetic flux is not travelling about a closed path when crossing the gap, thereby allowing some magnetic flux to flow away from first and second magnetic elements 230, 232. Reducing this gap may increase the inductive charging efficiency of the invention, and may be accomplished by reducing the thickness of windows 216a, 216b, 224a and 224b.

However, reducing this thickness or eliminating these widows entirely may pose other challenges because permanent magnets, as well as other types of magnets, may be prone to corrosion and/or scratching if left exposed by plug and receptacle connectors. Accordingly, windows 216a, 216b, 224a and 224b are provided to protect the distal tips of first and second magnetic elements 230, 232, whether they be permanent magnets or otherwise. Suitable materials such as strong polymers, sapphire, other strong materials that are magnetically permeable or a combination thereof may be used to form windows 216a, 216b, 224a and 224b. Windows 216a, 216b, 224a and 224b may be discrete elements having dimensions as outlined above or they may be exposed portions of a larger element or elements, e.g., they may be integrally formed with a housing of receptacle connector 212.

The inductive charging interface with magnetic retention as outlined above possesses numerous advantages over traditional wired and wireless charging interfaces. For example, many traditional wired charging interfaces include receptacle connector having an opening that can collect debris. Debris can create interfere with power and data transfer between plug and receptacle connectors. Conversely, receptacle connector 212 may include a flat mating surface 214 that interfaces with a mating end 220 of plug connector 202, thereby eliminating connector openings and the potential for debris buildup within connector openings. Additionally, the magnetic field generated by plug connector 202 may rotate and translate plug connector 202 as necessary to properly connect, orient and align it with receptacle connector 212, thereby to preventing losses and providing a more efficient magnetic flux flow. This magnetic field, in combination with a minimal gap provided between first and second magnetic elements 230, 232, can allow the present invention to achieve inductive charging efficiency that may exceed that of traditional inductive charging methods.

Although device 200 is shown and described as one particular electronic media device, embodiments of the invention are suitable for use with a multiplicity of electronic devices. For example, any device that receives or transmits audio, video or data signals may include the invention. These devices can a multipurpose button as an input component, a touch screen display as both an input and an output component, and a speaker as an output component, all of which can be housed within a device housing that can be made from a metallic material.

As used herein, the term "electronic device" or "device" can include any device with at least one electronic component that may be used to present human-perceivable media. In some instances, embodiments of the invention are particularly well suited for use with electronic media devices because they often include a rechargeable battery. Such devices may include, for example, portable music players (e.g., MP3 devices and Apple's iPod devices), portable video players (e.g., portable DVD players), cellular telephones (e.g., smart telephones such as Apple's iPhone devices), wearable devices such as smartwatches, video cameras, digital still cameras, projection systems (e.g., holographic projection systems), gaming systems, PDAs, desktop computers, as well as tablet (e.g., Apple's iPad devices), laptop or other mobile computers. Other examples of electronic devices include docking stations, chargers, an external power source such as an external battery, cable adapters, clock radios, game controllers, audio equipment, headsets or earphones, video equipment and adapters, keyboards, medical sensor devices such as heart rate monitors and blood pressure monitors, point of sale (POS) terminals, as well as numerous other hardware devices that can connect to and exchange data with a host device.

In one embodiment, plug connector 202 can be the plug connector of a plug connector/receptacle connector interface that can be the primary physical connector system for an ecosystem of products that includes both host electronic devices and accessory devices. Examples of host devices include smart phones, portable media players, tablet computers, laptop computers, desktop computers and other computing devices. An accessory can be any piece of hardware that connects to and communicates with or otherwise expands the functionality of the host. Many different types of accessory devices can be specifically designed or adapted to receive power from plug connector 202 and to provide additional functionality for the host. Although plug connector 202 is only described above as providing power, embodiments of the present invention include data contacts on plug 202 and corresponding contacts on receptacle connector 212.

Plug connector 202 can be incorporated into each accessory device that is part of the ecosystem to enable the host to provide power to plug connector 202 when the accessory is mated with a corresponding receptacle connector of the host device. Examples of accessory devices include docking stations, charge cables and devices, cable adapters, clock radios, game controllers, audio equipment, headsets, video equipment and adapters, keyboards, medical sensors such as heart rate monitors and blood pressure monitors, point of sale (POS) terminals, as well as numerous other hardware devices that can connect to and exchange data with the host device. Various wireless communication protocols may be used to communicate data between the host device and the accessory.

It will also be appreciated that the device 200 and plug connector 202 described above are illustrative and that various modifications are possible. For instance, although plug connector 202 is shown in FIG. 2A as having a rounded rectangular shape with a thickness, plug connector 202 may be spherically shaped, have a non-constant thickness and/or width, or be otherwise shaped in other embodiments. As another example, device housing 210 may be made from a non-metallic material, e.g., a polymer or other non-conductive materials. In embodiments where housing 210 is made from a non-conducive material, windows 216a and 216b may be made from the same material as housing 210 or may be integrally formed with housing 210. Windows 224a and 224b may also be made from material different than that of base 218 or may be integrally formed with base 218.

In some embodiments, first and second magnetic elements 230, 232 may be horseshoe magnets. Alternatively, permanent magnets 244a, 244b, 240a and 240b may be replaced with ferromagnetic materials capable of magnetic attraction, rare-earth magnets, or other materials capable of substantially maintaining plug connector 202 and corresponding receptacle connector 212 in a mated position using magnetic forces.

In some embodiments, one or more windows 216a and 216b and 224a and 224b may be located differently on receptacle connector 212 and plug connector 202, respectively, than as shown in FIG. 2A. For example, these windows may be located on any one or more of front, back, left, right, or top surfaces of device 200 and plug connector 202. Furthermore, first and second magnetic elements 230, 232 (or variations thereof as described herein) may be disposed within the plug and receptacle connectors, respectively, and adjacent to magnetically permeable windows, e.g., the distal tips of first and second magnetic elements 230, 232 are positioned with respect to magnetically permeable windows as shown in FIG. 2B. Additionally, the magnetically permeable windows of the receptacle connector 212 may be located in a recessed section of housing 210. Examples of additional magnetically permeable window variations are illustrated in the following figures.

1. Unitary Magnetically Permeable Window

FIG. 3 illustrates a simplified perspective view of a device 300 and a plug connector 302 corresponding to a receptacle connector 312 of device 300, according to an embodiment of the present invention. Device 300 and plug connector 302 may be similar to device 200 and plug connector 202, respectively, except that they each include a single or unitary magnetically permeable window, instead of two windows. As shown in FIG. 3, Device 300 includes a receptacle connector 312 positioned within housing 310 such that a magnetically permeable window 316, which may be a surface that contacts corresponding plug connectors during charging, of receptacle connector 312 is disposed at an exterior of the device housing 310. The function of window 316 may be similar to that of windows 216a, 216b (shown in FIGS. 2A and 2B). For simplicity, various internal components, such as the control circuitry, graphics circuitry, bus, memory, storage device and other components are not shown in FIG. 3.

As further shown in FIG. 3, plug connector 302 includes a body 318 having a magnetically permeable window 324 and a cable 322 attached at an end opposite the magnetically permeable window 324. Magnetically permeable window 324 is sized to interface with magnetically permeable window 316 of corresponding receptacle connector 312 during a mating event. When plug connector 302 is mated with corresponding receptacle connector 312, magnetically permeable window 324 is brought into contact with magnetically permeable window 316 such that magnetically permeable window 324 can be aligned with, i.e., centered over, magnetically permeable window 316.

Windows 316 and 324 may be between about 2 mm and 7 mm tall, about 15 mm and 45 mm wide and about 0.25 mm and 0.5 mm thick, and may be made from a magnetically permeable material that is also electrically insulative, e.g., strong polymers, sapphire or other strong materials that are magnetically permeable and electrically insulative. As further described above with reference to FIG. 2B, these magnetically permeable materials can allow magnetic flux to flow to and from the magnetic elements (as shown in FIG. 2B) and through the windows 316 and 324. In addition, the insulative properties of these materials may insulate magnetic flux from the housing 310, which may be made from a metallic, conductive material that could cause losses during inductive charging if not insulated. Similar to the function provided by windows 216a, 216b, 224a and 224b, windows 316 and 324 allow magnetic flux to flow between plug connector 302 and receptacle connector 312 during inductive charging.

Again, device 300 and plug connector 302 may be similar in function as form to device 200 and plug connector 202, respectively, except that they each include a unitary magnetically permeable window (e.g., windows 316 and 324), instead of two windows. More specifically, the internal elements and variations thereof discussed with reference to FIG. 2B may also be included in device 300 and plug connector 302. Furthermore, device 300 and plug connector 302 may function in a manner similar to device 200 and plug connector 202, which manner and variations thereof were described above with reference to FIG. 2B. However, instead of having magnetic flux flow into some windows and out of others as with device 200 and plug connector 202, magnetic flux flows both into and out of each of windows 316 and 324.

Accordingly, plug connector 302 may be used to inductively charge device 300, and this charging configuration may realize advantages discussed with reference to FIG. 2B. Implementing unitary magnetically permeable windows may provide additional advantage in some situations, e.g., reducing part count may simplify the manufacturing/assembly process of device 300 and plug connector 302 and/or provide a different aesthetic appearance.

In some embodiments, one of plug connector 302 and receptacle connector 312 may include a unitary magnetically permeable window while the other connector may include two magnetically permeable windows, e.g., windows 216a, 216b or windows 224a and 224b. Examples of yet additional window variations are illustrated in the following figures.

2. Magnetically Permeable Window Frames

Figure 4:
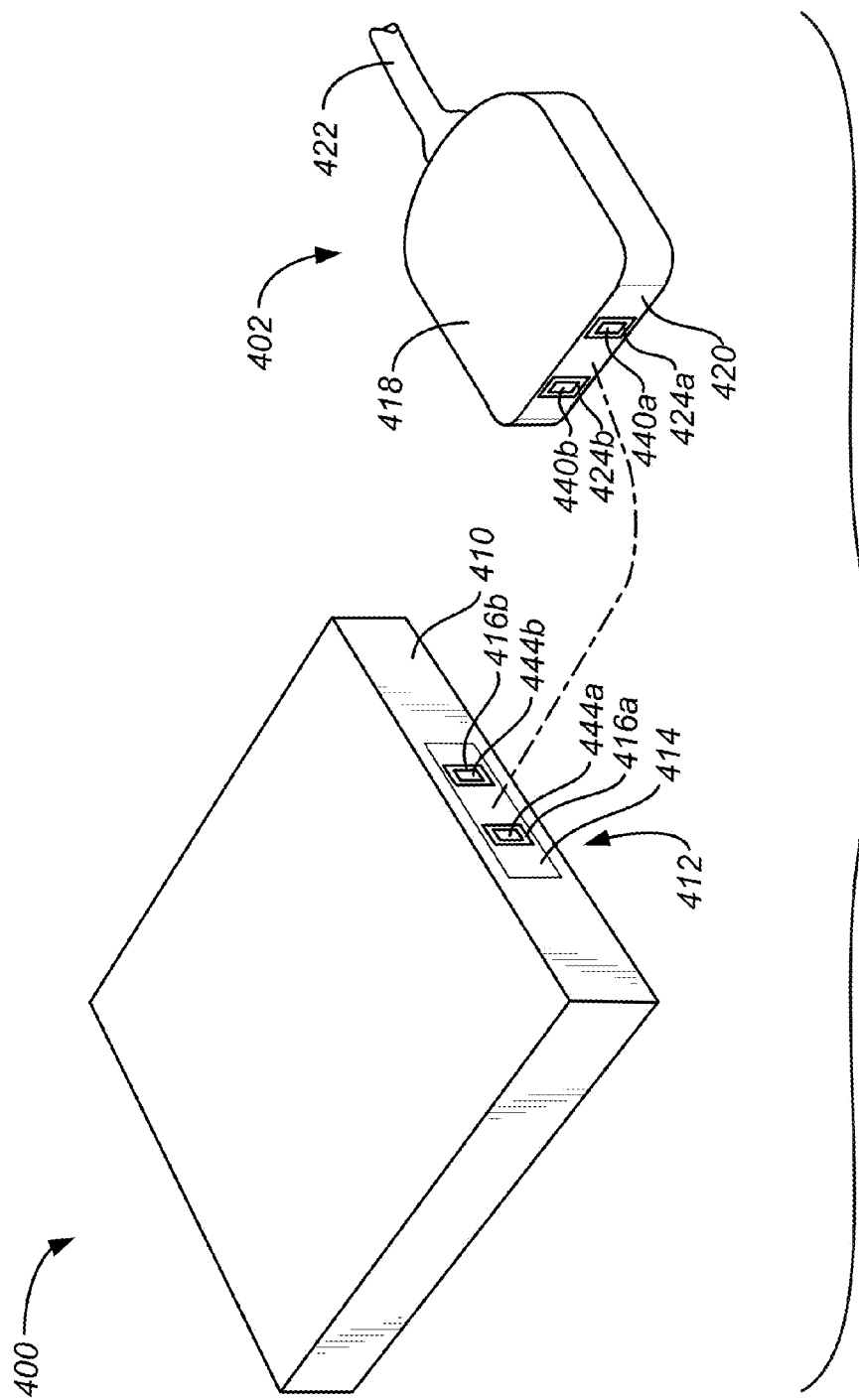
FIG. 4 illustrates a simplified perspective view of a device and a plug connector corresponding to a receptacle connector of the device, according to an embodiment of the present invention.

FIG. 4 illustrates a simplified perspective view of a device 400 and a plug connector 402 corresponding to a receptacle connector 412 of device 400, according to an embodiment of the present invention. Device 400 and plug connector 402 may be similar to device 200 and plug connector 202, respectively, except that they each include two magnetically permeable window frames that circumscribe distal tips of magnet elements, instead of two windows covering distal tips of magnetic elements. In addition, the receptacle connector of device 400 (e.g., receptacle connector 412) can be located at a different position than that of device 200.

As shown in FIG. 4, device 400 includes a receptacle connector 412 positioned within housing 410 such that a mating surface 414 of receptacle connector 412 is disposed at an exterior of the device housing 410. Mating surface 414 includes two magnetically permeable window frames 416a, 416b that frame or circumscribe permanent magnets 444a, 444b of a first magnetic element (not shown, but see, e.g., magnetic element 232 in FIG. 2B). The function of window frames 416a, 416b may be similar to that of windows 216a, 216b (shown in FIGS. 2A and 2B) to the extent that windows 216a, 216b provide shielding for magnetic flux from potential interference caused by housing 210; however, only incidental magnetic flux may flow through window frames 416a, 416b. Instead, magnetic flux may flow directly from exposed distal tips of permanent magnets 444a, 444b to corresponding distal tips of permanent magnets 440a, 440b of a second magnetic element (not shown, but see, e.g., magnetic element 230 in FIG. 2B) of plug connector 402. For simplicity, various internal components, such as the control circuitry, graphics circuitry, bus, memory, storage device and other components are not shown in FIG. 4.

As further shown in FIG. 4, plug connector 402 includes a body 418 having a mating end 420 and a cable 422 attached at an end opposite of mating end 420. Mating end 420 is sized to interface with mating surface 414 of corresponding receptacle connector 412 during a mating event and includes first and second magnetically permeable window frames 424a, 424b that frame or circumscribe distal tips of permanent magnets 440a, 440b. When plug connector 402 is mated with corresponding receptacle connector 412, mating end 420 is brought into contact with mating surface 414 such that permanent magnets 440a and 440b can be aligned with, i.e., centered over, and in contact with permanent magnets 444a and 444b, respectively.

Window frames 416a, 416b, 424a and 424b may be between about 2 mm and 7 mm tall, about 5 mm and 15 mm wide and about 0.25 mm and 0.5 mm thick and may include an opening for receiving distal ends of permanent magnets 440a, 440b, 444a and 444b. The frames may be made from a magnetically permeable material that is also electrically insulative, e.g., strong polymers, sapphire or other strong materials that are magnetically permeable and electrically insulative. As further described above with reference to FIG. 2B, the insulative properties of these materials may insulate magnetic flux from the housing 410, which may be made from a metallic, conductive material that could cause losses during inductive charging if not insulated.

As mentioned above, in contrast with the embodiments described with reference to FIGS. 2A, 2B and 3, magnetic flux may flow directly between permanent magnets 440a and 444a and between permanent magnets 440b and 444b during inductive charging, without passing through a window (e.g., windows 216a, 216b, 224a and 224b). Nonetheless, the internal elements and variations thereof discussed with reference to FIG. 2B may also be included in device 400 and plug connector 402. Furthermore, aside from the differences described, device 400 and plug connector 402 may function in a manner similar to device 200 and plug connector 202, which manner and variations thereof were described above with reference to FIG. 2B.

Accordingly, plug connector 402 may be used to inductively charge device 400, and this charging configuration may realize advantages discussed with reference to FIG. 2B. In addition, the gaps between permanent magnets 444a and 440a and permanent magnets 440b and 444b may be smaller as compared to other embodiments discussed above because windows (e.g., windows 216a, 216b, 224a and 224b) are not disposed between these magnets. As such, the distance or gap between permanent magnets 444a and 440a and permanent magnets 440b and 444b may be less than about 0.2 mm. Thus, the magnetic flux flow path between device 400 and plug connector 402 may be closed or nearly closed, charging losses may be reduced and inductive charging efficiency may be increased.

It will also be appreciated that device 200 and plug connector 202 described above are illustrative and that various modifications are possible. For instance, the exposed ends of permanent magnets 440a, 440b, 444a and 444b may still be otherwise protected from corrosion and scratching, e.g., using a coating, plating and/or an air gap smaller than the window material gap, instead of including magnetically permeable windows that cover the exposed ends of permanent magnets 440a, 440b, 444a and 444b. As another example, one of plug connector 402 and receptacle connector 412 may include a unitary magnetically permeable window, e.g., windows 316 and 324, while the other connector includes two magnetically permeable windows, e.g., windows 216a, 216b or windows 224a and 224b. Plug connector 402 and receptacle connector 412 may also each include a combination of window frames and windows.

FIGS. 2A, 2B, 3 and 4 all illustrate embodiments of the present invention that include a single circular magnetic flux path or loop where halves of a magnetic core, e.g., first and second magnetic elements, can be located within plug and receptacle connectors. Examples of additional embodiments that include more than one magnetic flux path or loop are illustrated in the following figures.

B. Multi-Loop Inductive Charging Interface

Figure 5B:
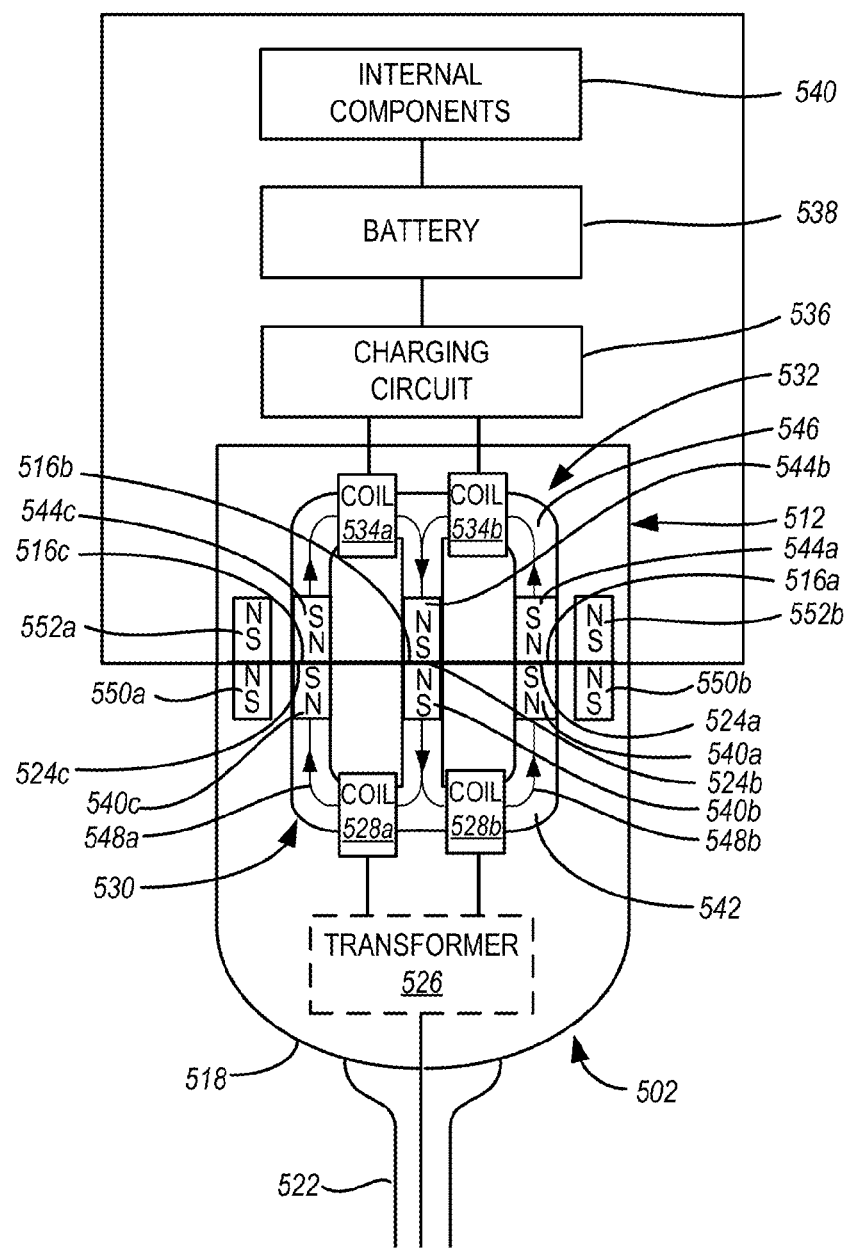

FIGS. 5A and 5B illustrate simplified perspective and internal structure views of a device 500 and a plug connector 502 corresponding to a receptacle connector 512 of device 500, according to an embodiment of the present invention. Device 500 and plug connector 502 may be similar to device 200 and plug connector 202 (as shown in FIGS. 2A and 2B), respectively, except that they each include E-shaped first and second magnetic elements, instead of U-shaped first and second magnetic elements (e.g., magnetic elements 230, 232 as shown in FIG. 2B). Yet, these E-shaped first and second magnetic elements may also facilitate inductive charging. More specifically, these halves of a magnetic core may guide magnetic flux flow along two substantially closed flux flow paths during inductive charging.

As shown in FIG. 5A, device 500 includes a receptacle connector 512 positioned within housing 510 such that a mating surface 514 of receptacle connector 512 is disposed at an exterior of the device housing 510. Mating surface 514 includes first, second and third magnetically permeable windows 516a, 516b, and 516c. The function of windows 516a, 516b, 516c will be described below with reference to FIG. 5B. For simplicity, various internal components, such as the control circuitry, graphics circuitry, bus, memory, storage device and other components are not shown in FIG. 5A.

As further shown in FIG. 5A, plug connector 502 includes a body 518 having a mating end 520 and a cable 522 attached at an end opposite of mating end 520. Mating end 520 is sized to interface with mating surface 514 of corresponding receptacle connector 512 during a mating event and includes first, second and third magnetically permeable windows 524a, 524b, 524c. When plug connector 502 is mated with corresponding receptacle connector 512, mating end 520 is brought into contact with mating surface 514 such that windows 524a, 524b and 524c can be aligned with, i.e., centered over, and in contact with windows 516a, 516b, and 516c, respectively.

Windows 516a, 516b, 516c, 524a, 524b, and 524c may each be between about 2 mm and 7 mm tall, about 5 mm and 15 mm wide and about 0.25 mm and 0.5 mm thick, and may be made from a magnetically permeable material that is also electrically insulative, e.g., strong polymers, sapphire or other strong materials that are magnetically permeable and electrically insulative. As further described below, these magnetically permeable materials can allow magnetic flux to flow to and from magnetic elements (as shown in FIG. 5B) and through the windows of plug connector 502 and receptacle connector 512. In addition, the insulative properties of these materials may insulate magnetic flux from the housing 510, which may be made from a metallic, conductive material that could cause losses during inductive charging if not insulated. The following figure illustrates how magnetic flux flows through windows 516a, 516b, 516c, 524a, 524b, and 524c and between plug connector 502 and receptacle connector 512 during inductive charging.

Optionally, as shown in FIG. 5B, plug connector 502 can include a transformer 526. First and second inductive transmission coils 528a, 528b can be coupled to transformer 526 and wound around a first magnetic element 530. FIG. 5B also shows that receptacle connector 512 includes a second magnetic element 532 and first and second inductive receiving coils 534a, 534b wound around second magnetic element 532. Device 500 is also shown as including a charging circuit 536, a battery 538 and internal components 540.

First and second magnetic elements 530, 532 both include permanent magnets at their distal tips and a magnetically permeable material, e.g., a ferrite material such as iron, extending between the permanent magnets. More specifically, first magnetic element 530 includes first, second and third permanent magnets 540a, 540b and 540c and a ferrite material element 542 extending between the first, second third permanent magnets 540a, 540b and 540c. Similarly, second magnetic element 532 includes first, second and third permanent magnets 544a, 544b and 544c and a ferrite material element 546 extending between first, second and third permanent magnets 544a, 544b and 544c. As shown in FIG. 5B, the poles of permanent magnets 544a, 544b and 544c are aligned to magnetically attract permanent magnets 540a, 540b and 540c, respectively. First and second magnetic elements 530, 532 may each be E-shaped as shown in FIG. 5B or otherwise shaped, e.g., shaped liked halves of a toroid—a half-toroid—or other shapes that would allow for magnetic flux to flow in a circular directions within the first second magnetic elements 530, 532. First and second magnetic elements 530, 532 may function in a manner similar to magnetic or ferromagnetic cores in traditional inductive charging configurations.

Device 500 may be inductively charged when plug connector 502 and receptacle connector 512 are mated, as shown in FIG. 5B. During this inductive charging, cable 522 provides power to transformer 526 from a power source, e.g., a wall socket. Transformer 526 converts the power received from cable 522 as necessary and provides A/C power to transmission coils 528a, 528b. Alternatively, if plug connector 502 does not include transformer 526, cable 522 can provide A/C power directly to transmission coils 528a, 528b. Transmission coils 528a, 528b can be wrapped around first magnetic element 530 of a magnetic core. As time-varying current flows through transmission coils 528a, 528b, varying first and second magnetic fluxes 548a, 548b can be created and may flow within and between first and second magnetic elements 530, 534. First magnetic flux 548a travels between first and second magnetic elements 530, 532 via magnetically permeable windows 516a, 516b, 524a and 524b. Second magnetic flux 548b travels between first and second magnetic elements 530, 532 via magnetically permeable windows 516b, 516c, 524b and 524c. Thus, the first and second magnetic elements 530, 532 may form portions of two substantially closed flux flow paths for varying magnetic fluxes 548a, 548b, i.e., varying magnetic fluxes 548a, 548b may flow substantially within first and second magnetic elements 530, 532, as guided by the polarity of permanent magnets 540a, 540b, 540c, 544a, 544b and 544c.

Magnetic fluxes 548a, 548b can create time-varying magnetic fields that travel through first and second receiving coils 534a, 534b of receptacle connector 512, thereby inducing a time-varying current in receiving coils 534a, 534b. As shown in FIG. 5B, a charging circuit 536 is coupled to receiving coils 534a, 534b. As such, the induced currents can be provided to and used by charging circuit 536 to charge a battery 538 that powers internal components 540 of device 500, e.g., control circuitry, graphics circuitry, bus, memory, storage device and other components. In this manner, an electrical connection, e.g., cable 522 or transformer 526, may apply a current to inductive transmission coils 528a, 528b in order to induce a current in inductive receiving coils 234a, 234b and charge device 200.

As mentioned above, the poles of permanent magnets 540a, 540b and 540c are aligned to magnetically attract permanent magnets 544a, 544b and 544c, respectively. As such, when plug connector 502 is sufficiently proximate receptacle connector 512, magnetic forces will bring plug connector 502 into contact with receptacle connector 512, as shown in FIG. 5B. For example, the magnetic forces may rotate plug connector 502 about its longitudinal axis and translate plug connector 502 in the vertical and/or horizontal directions until orientated and aligned with respect to receptacle connector 512 as shown in FIG. 5B. Additionally, once mated, the magnetic forces can provide a retention force to retain or hold plug connector 502 in contact with receptacle connector 512 in the mated position. The size and/or strength of permanent magnets 540a, 540b, 540c, 544a, 544b and 544c may be varied to adjust the retention force and the proximity between plug connector 502 and receptacle connector 512 required for plug connector 502 to be oriented, aligned and brought into contact with receptacle connector 512. Thus, an interference fit between receptacle connector 512 and plug connector 202 may not be required, and the retention features outlined above with reference to FIGS. 1A-1B may also not be required.

Additional magnets may be included in plug connector 502 and/or receptacle connector 512 to provide an increased magnetic retention force. For example, as shown in FIG. 5B, plug connector 502 may include permanent magnets 550a and 550b and receptacle connector 512 may include permanent magnets 552a and 552b. The poles of permanent magnets 550a, 550b, 552a and 552b may be aligned as shown in FIG. 5B or otherwise aligned such that an additional magnetic force is created between plug connector 502 and receptacle connector 512 to provide magnetic retention. The additional magnets may be electrically isolated, e.g., surrounded by an insulative material such as a polymer, to minimize interference experienced by magnetic flux 248. The number of additional magnets may be varied, e.g., more or less permanent magnets may be implemented in plug connector 502 and receptacle connector 512.

As also mentioned above, the first and second magnetic elements 530, 532 may form portions of substantially closed flux flow paths. The flux flow paths between first and second magnetic elements 530, 532 may be substantially closed rather than completely closed because the thickness of windows 516a, 516b, 516c, 524a, 524b and 524c create small gaps between the first and second magnetic elements 530, 532. These gaps between corresponding distal tips of the first and second magnetic elements 530, 532 may be, for example, between about 0.5 mm and 1.0 mm or between about 0.2 mm and 1.2 mm. Losses may occur at these gaps because the magnetic flux is not travelling about a closed path when crossing the gap, thereby allowing some magnetic flux to flow away from first and second magnetic elements 530, 532. Reducing this gap may increase the inductive charging efficiency of the invention, and may be accomplished by reducing the thickness of windows 516a, 516b, 516c, 524a, 524b and 524c.

However, reducing this thickness or eliminating these widows entirely may pose other challenges because permanent magnets, as well as other types of magnets, may be prone to corrosion and/or scratching if left exposed by plug and receptacle connectors. Accordingly, windows 516a, 516b, 516c, 524a, 524b and 524c are provided to protect the distal tips of first and second magnetic elements 530, 532, whether they be permanent magnets or otherwise. Suitable materials such as strong polymers, sapphire, other strong materials that are magnetically permeable or a combination thereof may be used to form windows 516a, 516b, 516c, 524a, 524b and 524c. Windows 516a, 516b, 516c, 524a, 524b and 524c may be discrete elements having dimensions as outlined above or they may be exposed portions of a larger element or elements, e.g., they may be integrally formed with a housing of receptacle connector 512.

The inductive charging interface with magnetic retention as outlined above possesses numerous advantages over traditional wired and wireless charging interfaces. For example, many traditional wired charging interfaces include a receptacle connector having an opening that can collect debris. Debris can create interfere with power and data transfer between plug and receptacle connectors. Conversely, receptacle connector 512 may include a flat mating surface 514 that interfaces with a mating end 520 of plug connector 502, thereby eliminating connector openings and the potential for debris buildup within connector openings. Additionally, the magnetic field generated by plug connector 502 may rotate and translate plug connector 502 as necessary to properly connect, orient and align with receptacle connector 512 to prevent losses and provide a more efficient magnetic flux flow. This magnetic field, in combination with a minimal gap provided between first and second magnetic elements 530, 532, can allow the present invention to achieve inductive charging efficiency that may exceed that of traditional inductive charging methods.

In addition, plug connector 502 may be reversible, i.e., it may be connected with receptacle connector 512 in either of two orientations that differ by 180°. For example, in addition to the orientation shown in FIG. 5B, plug connector 502 may also be mated with receptacle connector 512 when rotated 180°, as compared to the orientation shown in FIG. 5B, about its longitudinal axis. In either of these two orientations, the poles of the magnets of plug connector 502 and receptacle connector 512 may be properly aligned to allow for mating.

It will also be appreciated that the device 500 and plug connector 502 described above are illustrative and that various modifications are possible. For instance, although plug connector 502 is shown in FIG. 5A as having a rounded rectangular shape with a thickness, plug connector 502 may be spherically shaped, have a non-constant thickness and/or width, or may be otherwise shaped in other embodiments. As another example, the magnetic elements of the magnetic core may be formed to create more than two loops, e.g., three or four loops, and complementing elements could be scaled and/or modified as necessary to support additional loops for inductive charging. As yet another example, device housing 510 may be made from a non-metallic material, e.g., a polymer or other non-conductive materials. In embodiments where housing 510 is made from a non-conducive material, windows 516a, 516b and 516c may be made from the same material as housing 510 or may be integrally formed with housing 510. Windows 524a, 524b and 524c may also be made from different material than that of base 518 or may be integrally formed with base 518.

In some embodiments, first and second magnetic elements 530, 532 may be horseshoe magnets. Alternatively, permanent magnets 544a, 544b, 544c, 540a, 540b and 540c may be replaced with ferromagnetic materials capable of magnetic attraction, rare-earth magnets, or other materials capable of substantially maintaining plug connector 502 and corresponding receptacle connector 512 in a mated position using magnetic forces.

In some embodiments, one or more windows 516a, 516b and 516c and 524a, 524b and 524c may be located on different surfaces of receptacle connector 512 and plug connector 502, respectively, than shown in FIG. 5A. For example, these windows may be located on any one or more of front, back, left, right, or top surfaces of device 500 and plug connector 202. And first and second magnetic elements 530, 532 (or variations thereof as described herein) may be disposed within the plug and receptacle connectors, respectively, and adjacent to a magnetically permeable window, e.g., the distal tips of first and second magnetic elements 530, 532 are positioned with respect to magnetically permeable windows as shown in FIG. 5B. Additionally, the magnetically permeable windows of the receptacle connector 512 may be located in a recessed section of housing 510. Examples of additional magnetically permeable window variations are illustrated in the following figures.

1. Unitary Magnetically Permeable Window

Figure 6:
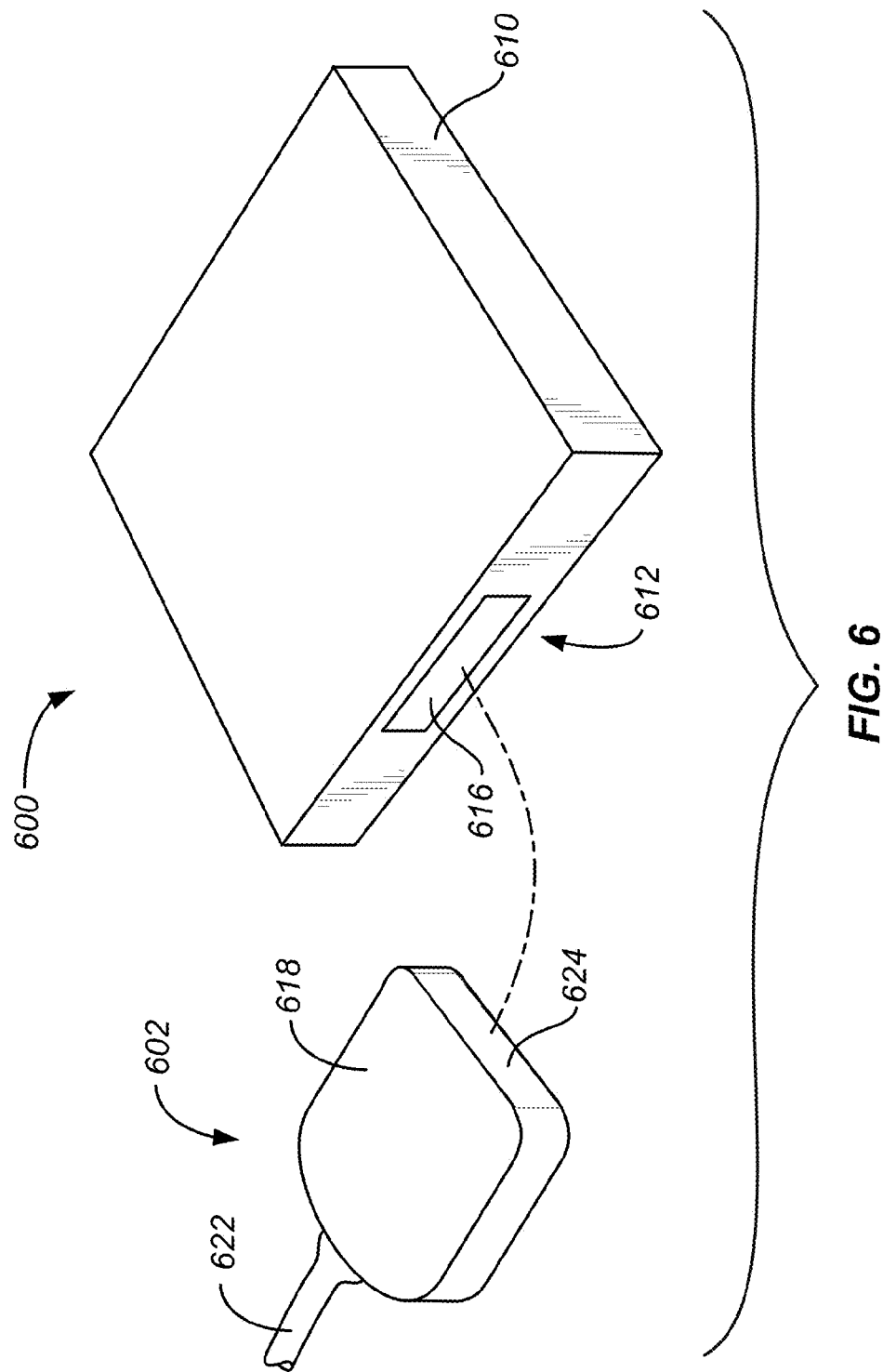
FIG. 6 illustrates a simplified perspective view of a device and a plug connector corresponding to a receptacle connector of the device, according to an embodiment of the present invention.

FIG. 6 illustrates a simplified perspective view of a device 600 and a plug connector 602 corresponding to a receptacle connector 612 of device 600, according to an embodiment of the present invention. Device 600 and plug connector 602 may be similar to device 500 and plug connector 502, respectively, except that they each include a single or unitary magnetically permeable window, instead of two windows; similar to the differences between device 200 and plug 202 and device 300 and plug 302, respectively. Accordingly, the description above concerning how device 300 and plug 302 may vary from device 200 and plug 202, respectively, may also apply here as it pertains to how device 600 and plug connector 602 may differ from device 500 and plug connector 502, respectively.

As shown in FIG. 6, device 600 includes a receptacle connector 612 positioned within housing 610 such that a magnetically permeable window 616, which may be a surface that contacts corresponding plug connectors during charging, of receptacle connector 612 is disposed at an exterior of the device housing 610. The function of window 616 may be similar to that of windows 516a, 516b and 516c (shown in FIGS. 5A and 5B). For simplicity, various internal components, such as the control circuitry, graphics circuitry, bus, memory, storage device and other components are not shown in FIG. 6.

As further shown in FIG. 6, plug connector 602 includes a body 618 having a magnetically permeable window 624 and a cable 622 attached at an end opposite the magnetically permeable window 624. Magnetically permeable window 624 is sized to interface with magnetically permeable window 616 of corresponding receptacle connector 612 during a mating event. When plug connector 602 is mated with corresponding receptacle connector 612, magnetically permeable window 624 is brought into contact with magnetically permeable window 616 such that magnetically permeable window 624 can be aligned with, i.e., centered over, magnetically permeable window 616.

Windows 616 and 624 may be between about 2 mm and 7 mm tall, about 15 mm and 45 mm wide and about 0.25 mm and 0.5 mm thick, and may be made from a magnetically permeable material that is also electrically insulative, e.g., strong polymers, sapphire or other strong materials that are magnetically permeable and electrically insulative. As further described above with reference to FIG. 5B, these magnetically permeable materials can allow magnetic flux to flow to and from the magnetic elements (as shown in FIG. 5B) and through the windows 616 and 624. In addition, the insulative properties of these materials may insulate magnetic flux from the housing 610, which may be made from a metallic, conductive material that could cause losses during inductive charging if not insulated. Similar to the function provided by windows 516a, 516b, 516c, 524a, 524b and 524c, windows 616 and 624 allow magnetic flux to flow between plug connector 602 and receptacle connector 612 during inductive charging.

Again, device 600 and plug connector 602 may be similar to device 500 and plug connector 502, respectively, in function and form except that they each include a unitary magnetically permeable window (e.g., windows 616 and 624), instead of two windows. More specifically, the internal elements and variations thereof discussed with reference to FIG. 5B may also be included in device 600 and plug connector 602. Furthermore, device 600 and plug connector 602 may function in a manner similar to device 500 and plug connector 602, which manner and variations thereof were described above with reference to FIG. 5B. However, instead of having magnetic flux flow into some windows and out of others as with device 500 and plug connector 502, magnetic flux flows both into and out of each of windows 616 and 624.

Accordingly, plug connector 602 may be used to inductively charge device 600, and this charging configuration may realize advantages discussed with reference to FIG. 5B. Implementing unitary magnetically permeable windows may provide additional advantage in some situations, e.g., reducing part count may simplify the manufacturing/assembly process of device 600 and plug connector 602 or may provide a different aesthetic appearance.

In some embodiments, one of plug connector 602 and receptacle connector 612 may include a unitary magnetically permeable window while the other connector may include one, two or three magnetically permeable windows, e.g., windows 516a, 516b, 516c, 524a, 524b and 524c. Examples of yet additional window variations are illustrated in the following figures.

2. Magnetically Permeable Window Frames

Figure 7:
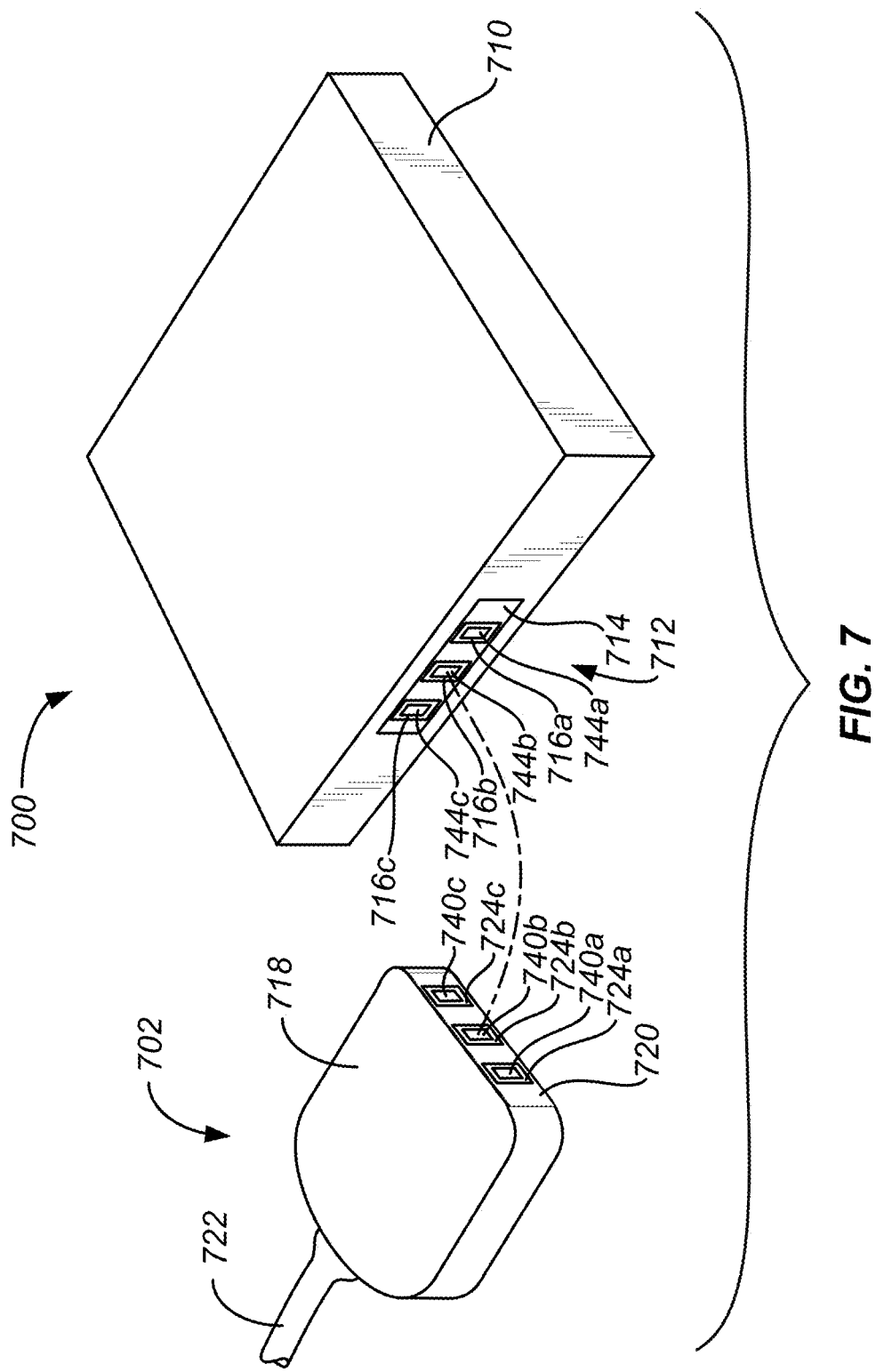
FIG. 7 illustrates a simplified perspective view of a device and a plug connector corresponding to a receptacle connector of the device, according to an embodiment of the present invention.

FIG. 7 illustrates a simplified perspective view of a device 700 and a plug connector 702 corresponding to a receptacle connector 612 of device 600, according to an embodiment of the present invention. Device 700 and plug connector 702 may be similar to device 600 and plug connector 602, respectively, except that they each include three magnetically permeable window frames that circumscribe distal tips of magnet elements, instead of two windows covering distal tips of magnetic elements; similar to the differences between device 200 and plug 202 and device 400 and plug 402, respectively. Accordingly, the description above concerning how device 400 and plug 402 may vary from device 200 and plug 202, respectively, may also apply here as it pertains to how device 700 and plug connector 702 may differ from device 500 and plug connector 502, respectively.

For example, as shown in FIG. 7, device 700 includes a receptacle connector 712 positioned within housing 710 such that a mating surface 714 of receptacle connector 712 is disposed at an exterior of the device housing 710. Mating surface 714 includes three magnetically permeable window frames 716a, 716b and 716c that frame or circumscribe permanent magnets 744a, 744b and 744c of a first magnetic element (not shown, but see, e.g., magnetic element 532 in FIG. 5B).

The function of window frames 716a, 716b and 716c may be similar to that of windows 516a, 516b and 516c (shown in FIGS. 5A and 5B) to the extent that windows 516a, 516b and 516c provide shielding for magnetic flux from potential interference caused by housing 510; however, only incidental magnetic flux may flow through window frames 716a, 716b and 716c. Instead, magnetic flux may flow directly from exposed distal tips of permanent magnets 744a, 744b and 744c to corresponding distal tips of permanent magnets 740a, 740b and 740c of a second magnetic element (not shown, but see, e.g., magnetic element 530 in FIG. 5B) of plug connector 702. For simplicity, various internal components, such as the control circuitry, graphics circuitry, bus, memory, storage device and other components are not shown in FIG. 7.

As further shown in FIG. 7, plug connector 702 includes a body 718 having a mating end 720 and a cable 722 attached at an end opposite of mating end 720. Mating end 720 is sized to interface with mating surface 714 of corresponding receptacle connector 712 during a mating event and includes first, second and third magnetically permeable window frames 724a, 724b and 724c that frame or circumscribe distal tips of permanent magnets 740a, 740b and 740c. When plug connector 702 is mated with corresponding receptacle connector 712, mating end 720 is brought into contact with mating surface 714 such that permanent magnets 740a, 740b and 740c can be aligned with, i.e., centered over, and in contact with permanent magnets 744a, 744b and 744c, respectively.

Window frames 716a, 716b, 716c, 724a, 724b and 724c may be between about 2 mm and 7 mm tall, about 5 mm and 15 mm wide and about 0.25 mm and 0.5 mm thick and may include an opening for receiving distal ends of permanent magnets 740a, 740b, 740c, 744a, 744b and 744c. The frames may be made from a magnetically permeable material that is also electrically insulative, e.g., strong polymers, sapphire or other strong materials that are magnetically permeable and electrically insulative. As further described above with reference to FIG. 5B, the insulative properties of these materials may insulate magnetic flux from the housing 710, which may be made from a metallic, conductive material that could cause losses during inductive charging if not insulated.

As mentioned above, in contrast with the embodiments described with reference to FIGS. 5A, 5B and 6, magnetic flux may flow directly between permanent magnets 740a and 744a, 740b and 744b, and 740c and 744c during inductive charging, without passing through a window (e.g., windows 716a, 716b, 716c, 724a, 724b and 724c). Nonetheless, the internal elements and variations thereof discussed with reference to FIG. 5B may also be included in device 700 and plug connector 702. Furthermore, aside from the differences described, device 700 and plug connector 702 may function in a manner similar to device 500 and plug connector 502, which manner and variations thereof were described above with reference to FIG. 5B.

Accordingly, plug connector 702 may be used to inductively charge device 700, and this charging configuration may realize advantages discussed with reference to FIG. 7B. In addition, the gaps between permanent magnets 744a, 744b and 744c and permanent magnets 740b, 744b and 744c may be smaller as compared to other embodiments discussed above because windows (e.g., windows 716a, 716b, 716c, 724a, 724b and 724c) are not disposed between these magnets. As such, the distance or gap between permanent magnets 744a and 740a, permanent magnets 740b and 744b and permanent magnets 740c and 744c may be less than about 0.2 mm. Thus, the magnetic flux flow path between device 700 and plug connector 702 may be closed or nearly closed, charging losses may be reduced and inductive charging efficiency may be increased.

It will also be appreciated that the device 700 and plug connector 702 described above are illustrative and that various modifications are possible. For instance, the exposed ends of permanent magnets 740a, 740b, 740c, 744a, 744b and 744c may still be otherwise protected from corrosion and scratching, e.g., using a coating, plating and/or an air gap smaller than the window material gap, instead of including magnetically permeable windows that cover the exposed ends of permanent magnets 740a, 740b, 740c, 744a, 744b and 744c. As another example, one of plug connector 702 and receptacle connector 712 may include a unitary magnetically permeable window (e.g., windows 616 and 624, as shown in FIG. 6), while the other connector may include three magnetically permeable windows e.g., windows 716a, 716b and 716c or windows 724a, 724b and 724c. Plug connector 702 and receptacle connector 712 may also each include a combination of window frames and windows.

FIGS. 2-7 all illustrate embodiments of the present invention that include halves of a magnetic core, e.g., first and second magnetic elements, which are orientated about a single plane. Examples of additional embodiments that include first and second magnetic elements that extend in more than one plane are illustrated in the following figures.

C. Multi-Planar Loop Inductive Charging Interface

Figure 8:
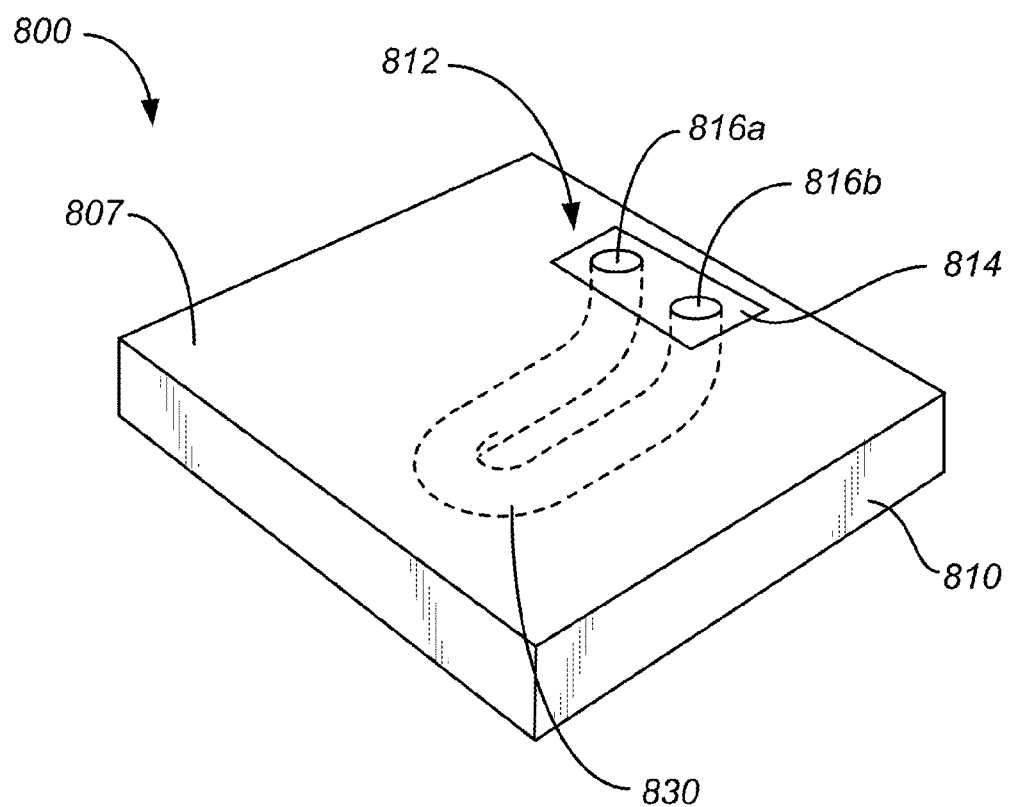
FIG. 8 illustrates a simplified perspective view of the back side of a device, according to an embodiment of the present invention.

FIG. 8 illustrates a simplified perspective view of the back side of a device 800, according to an embodiment of the present invention. Device 800 may be similar to other device embodiments discussed above except that the portion of the magnetic core included in device 800 may be disposed in a different location and extend in more than one plane. A corresponding plug connector may be used to inductively charge device 800 (e.g., any of the plug connectors described above that are sized for mating with this particular device and its receptacle connector).

As shown in FIG. 8, device 800 includes a receptacle connector 812 positioned within housing 810 such that a mating surface 814 of receptacle connector 812 is disposed at an exterior back surface of device housing 810. Mating surface 814 includes first and second magnetically permeable window 816a, 816b. A first magnetic element 830 (shown in dotted lines) may be included within housing 810 and positioned such that its distal ends are adjacent to windows 816a, 816b. As shown in FIG. 8, first magnetic element 830 may include a circular cross-section and may be generally U-shaped except for the curvature provided near its distal tips, leaving the distal tips extending in a direction perpendicular to the plane about which the rest of magnetic element 830 is oriented.

Accordingly, device 800 may support inductive charge device. And this charging configuration may provide a number of advantages. For example, first magnetic element 830 may be positioned and shaped so as to accommodate various components within device 800. Magnetic element 830 may also be otherwise shaped and positioned to meet design requirements for device 800. This flexibility may allow device 800 to more room for additional and/or different components. At the same time, the design of magnetic element 830 may still guide the magnetic flux flow path between device 800 and a corresponding plug connector in a closed or nearly closed loop, thereby reducing losses and increasing inductive charging efficiency.

Again, device 800, including first magnetic element 830, as well as a corresponding plug connector, may be similar to devices and plug connectors described above in function and form except for the difference in shape and location of first magnetic element 830. Thus, the discussion of form, function and additional internal and/or external elements described with reference to FIGS. 2A-7 may apply to this embodiment as well. Furthermore, embodiments of device 800 and corresponding plug connectors may vary in accordance with variations described with reference to the aforementioned embodiments.

It will also be appreciated that the device 800 and corresponding plug connectors described above are illustrative and that various modifications are possible. For instance, receptacle connector 814 may be located on other surfaces of device 800 or on other portions of the back surface. As another example, magnetic element 830 may not be symmetrical, but rather shaped to accommodate various internal components of device 800. As yet another example, the connector configuration included in device 800 may also be included in plug connectors and receptacle connector 814 may be replaced with other receptacle connector embodiments described herein.

Also, while a number of specific embodiments were disclosed with specific features, a person of skill in the art will recognize instances where the features of one embodiment can be combined with the features of another embodiment. For example, some specific embodiments of the invention set forth above were illustrated with receptacle connectors having a recess mating surface. A person of skill in the art will readily appreciate that plug connectors may also include this feature. Further, plug and receptacle connectors may include mating surfaces that are otherwise shaped (e.g., concave, convex, or non-symmetrically shaped) and mating and/or retention features may also be included with the plug and receptacle connectors (e.g., those described with reference to FIGS. 1A and 1B and various embodiments thereof). Also, those skilled in the art will recognize, or be able to ascertain using no more than routine experimentation, many equivalents to the specific embodiments of the inventions described herein. Such equivalents are intended to be encompassed by the following claims.

That which is claimed is:

1. A plug connector supporting inductive charging, the plug connector comprising:
    a permanent magnet generating a magnetic field that attracts a corresponding receptacle connector of an electronic device;
    a wire wound around a magnetically permeable material to form an inductive transmission coil, the magnetically permeable material being in abutting contact with the permanent magnet such that the permanent magnet and the magnetically permeable material form a portion of a magnetic flux flow path when electrical current is applied to the wire.

2. The plug connector of claim 1, wherein the permanent magnet is a first permanent magnet and the plug connector further comprises a second permanent magnet, the first permanent magnet located at a first distal tip of the magnetically permeable material, the second permanent magnet located at a second distal tip of the magnetically permeable material, the magnetically permeable material extending between the first and second permanent magnets.

3. The plug connector of claim 2, wherein the magnetic flux flow path is a circular magnetic flux flow path when the plug connector is mated with the corresponding receptacle connector.

4. The plug connector of claim 1, wherein the permanent magnet is a first permanent magnet and the plug connector further comprises second and third permanent magnets, the first permanent magnet located at a first distal tip of the magnetically permeable material, the second permanent magnet located at a second distal tip of the magnetically permeable material and the third permanent magnet located at a third distal tip of the magnetically permeable material.

5. The plug connector of claim 4, wherein the plug connector forms first and second circular magnetic flux flow paths when mated with the corresponding receptacle connector.

6. The plug connector of claim 1, further comprising:
    an electrical connection coupled to the inductive transmission coil and configured to apply the current to the inductive transmission coil to induce a current in an inductive receiving coil of the corresponding receptacle connector.

7. The plug connector of claim 1, further comprising:
    a magnetically permeable window adjacent to the permanent magnet, the magnetically permeable window forming a portion of an exterior surface of the plug connector, the magnetically permeable window configured to allow magnetic flux to flow to and from the corresponding receptacle connector when the corresponding receptacle connector is mated with the plug connector.

8. An electronic device that supports inductive charging, the electronic device comprising:
    a receptacle connector having a mating surface configured to mate with a corresponding plug connector, the receptacle connector comprising:
        a permanent magnet generating a magnetic field that is configured to attract a corresponding plug connector and orients and aligns the corresponding plug connector with the receptacle connector;
        a magnetically permeable material in abutting contact with the permanent magnet; and
        a wire wound around the magnetically permeable material to form an inductive receiving coil
    wherein the permanent magnet and the magnetically permeable material form a portion of a magnetic flux flow path that is configured to receive magnetic flux from the receptacle connector.

9. The electronic device of claim 8, wherein the permanent magnet is a first permanent magnet and the plug connector further comprises a second permanent magnet, the first permanent magnet located at a first distal tip of the magnetic permeable material, the second permanent magnet located at a second distal tip of the magnetically permeable material, the magnetically permeable material extending between the first and second permanent magnets.

10. The electronic device of claim 9, wherein the magnetic flux flow path is a circular magnetic flux flow path when the corresponding plug connector is mated with the receptacle connector.

11. The electronic device of claim 8, further comprising:
    a mating surface located adjacent to the magnetically permeable material, which forms a portion of an exterior surface of the electronic device and is configured to allow magnetic flux to flow to and from the corresponding plug connector when the corresponding plug connector is mated with the receptacle connector.

12. The electronic device of claim 11, wherein the mating surface is located at a recessed section of an external surface of the electronic device.

13. The electronic device of claim 8, further comprising a battery configured to receive electrical current from the inductive receiving coil.

14. The electronic device of claim 8, wherein the inductive receiving coil is formed in the shape of a half-toroid, and wherein the half-toroid includes curvatures extending in one or more planes.

15. A plug connector supporting inductive charging, the plug connector comprising:
    a housing having a mating end configured to mate with a corresponding receptacle connector, the housing comprising:
        first and second permanent magnets that cooperate to generate a magnetic field that attracts a corresponding receptacle connector of an electronic device and orients and aligns the plug connector therewith;
        a magnetically permeable material that extends between the first and second permanent magnets;
        an inductive transmission coil wound around the magnetically permeable material, wherein; and
        an electrical connection coupled to the inductive transmission coil and configured to apply a current to the inductive transmission coil to induce a current in an inductive receiving coil of the corresponding connector;
    wherein the first and second permanent magnets and the magnetically permeable material form a portion of a magnetic flux flow path when the electrical connection applies a current to the inductive transmission coil.

16. The plug connector of claim 15, wherein the magnetic flux flow path is a circular magnetic flux flow path when the plug connector is mated with the corresponding receptacle connector.

17. The plug connector of claim 15, wherein the mating end includes one or more magnetically permeable windows adjacent to the first and second permanent magnets.

18. The plug connector of claim 15, wherein a polarity of the first permanent magnet is oriented in a first direction and a polarity of the second permanent magnet is oriented in a second direction opposite the first direction.

19. The plug connector of claim 15, wherein the magnetic field maintains physical contact between the plug connector and the corresponding receptacle connector without the assistance of an interference fit between the plug connector and the corresponding receptacle connector.

20. The plug connector of claim 15, further comprising a cable coupled to the housing.

* * * * *